United States Patent [19]
Kestly

[11] Patent Number: 5,297,806
[45] Date of Patent: Mar. 29, 1994

[54] METHOD OF MAKING MULTI-DENSITY COMPOSITE GASKETS

[75] Inventor: Michael J. Kestly, Boilingbrook, Ill.

[73] Assignee: Dana Corporation, Toledo, Ohio

[21] Appl. No.: 742,119

[22] Filed: Aug. 8, 1991

[51] Int. Cl.⁵ .............................................. F16J 15/12
[52] U.S. Cl. .................................. 277/233; 277/235 B
[58] Field of Search .................... 277/235 B, 227, 180, 277/233, 234, 236

[56] References Cited

U.S. PATENT DOCUMENTS

| | | |
|---|---|---|
| 1,997,987 | 4/1935 | Victor, Jr. |
| 2,019,474 | 11/1935 | Bailey |
| 2,026,854 | 1/1936 | Victor |
| 2,157,102 | 5/1939 | Victor et al. |
| 2,245,122 | 6/1941 | Balfe |
| 2,679,241 | 5/1954 | Dickson ............. 277/235 B X |
| 2,681,241 | 6/1954 | Aukers ................... 277/234 |
| 3,352,564 | 11/1967 | Johnson ............. 277/235 B X |
| 3,608,914 | 9/1971 | Harby ................. 277/235 B |
| 3,784,212 | 1/1974 | Doerfling ........... 277/235 B X |
| 3,837,657 | 9/1974 | Farnam et al. .......... 277/1 |
| 3,841,289 | 10/1974 | Meyers ............... 277/235 B |
| 3,863,936 | 2/1975 | Farnam et al. ..... 277/235 B X |
| 4,325,559 | 4/1982 | Czernik et al. ....... 277/235 B |
| 4,330,585 | 5/1982 | Eyrard et al. ..... 277/235 B X |
| 4,428,593 | 1/1984 | Pearlstein ........... 277/235 B |
| 4,677,014 | 6/1987 | Bechen ............. 277/235 B X |
| 4,705,278 | 11/1987 | Locacius et al. ...... 277/235 B |
| 4,810,454 | 3/1989 | Belter ............... 277/235 B X |
| 4,962,939 | 10/1990 | Lönne et al. ......... 277/235 B |
| 5,082,298 | 1/1992 | Uchida et al. ........ 277/235 B |

FOREIGN PATENT DOCUMENTS

| | | | |
|---|---|---|---|
| 0147764 | 7/1985 | European Pat. Off. ........... 277/227 |
| 3425075 | 1/1986 | Fed. Rep. of Germany ... 277/235 B |
| 2574891 | 6/1986 | France ................................ 277/235 B |
| 0142164 | 11/1980 | Japan .................................. 277/227 |
| 0237307 | 6/1925 | United Kingdom ........... 277/235 B |
| 2053382 | 2/1981 | United Kingdom ........... 277/235 B |

Primary Examiner—William A. Cuchlinski, Jr.
Assistant Examiner—Scott W. Cummings
Attorney, Agent, or Firm—Dykema Gossett

[57] ABSTRACT

A method of forming a multiple density gasket is disclosed which includes the steps of moving both a first gasket material having a first lateral thickness, and a second gasket material having a second lateral thickness less than the first lateral thickness, along a path. Typically, a third gasket material is used, with the second material sandwiched between the first and third layers. The materials are compressed and gaskets are stamped from the compressed gasket material. The second material selectively forms higher density portions in the gasket. A unique gasket is formed by the above method wherein a higher density portion extends to the periphery of the gasket. In one embodiment the gasket is generally rectangular, with axial ends and lateral sides. The higher density portion extends between the axial ends of the gasket over a portion of the lateral width.

5 Claims, 2 Drawing Sheets

METHOD OF MAKING MULTI-DENSITY COMPOSITE GASKETS

BACKGROUND OF THE INVENTION

This application relates to a method for making multiple density gaskets.

Gaskets are used to seal various housing interfaces in devices which utilize fluid flow. As an example, a gasket is typically placed between the cylinder head and engine block in an engine to seal between the two, and in particular to seal the areas around the cylinder openings. Such gaskets typically extend outwardly of the cylinder openings to seal the areas around the bolts which connect the cylinder head and engine block. The gasket bears the load from the bolted connection of the housing members, and relies upon that load to provide a seal.

Certain areas of the gasket are subject to higher stress than other areas, and may require a denser gasket material to provide an adequate seal or resist deformation of the engine members. In other areas, however, a less dense gasket material will be sufficient. In a typical gasket application, the areas between the cylinder openings require high stress in order to seal. A denser gasket material may be desired between the cylinder openings than would be required radially outwardly of the cylinder openings. In a gasket with otherwise homogeneous density, a dense material could be used in the high stress areas, but would also be used in areas not subject to high stress. This is undesirable since a designer would like to transfer a majority of the force from the housing connection into limited high-stress areas of the gasket, rather than spreading the force equally over the entire gasket area. Using a denser material selectively at the high-stress area allows such focusing.

It is known to manufacture a composite gasket having a first portion of a first density with a second portion of a higher density. The second portion may be used in an area where it is desired to have additional density. Prior art methods of forming these multiple-density gaskets have been undesirably complex.

SUMMARY OF THE INVENTION

A disclosed method of forming a multiple density gasket includes the steps of moving first and second gasket materials along the path. A third material may also be moved along the path, with the second material sandwiched between the first and third. The second material has a lateral width, measured transversely to the path, which is smaller than the lateral width of the first and third materials. A metallic core layer may also be sandwiched between the first and third materials.

A composite gasket formed by the several layers passes through a roller station where it is compressed. The compressed gasket material then moves to a cutting station where the gasket is cut to shape. By selectively placing the second gasket material, an area of greater density is achieved over a portion of the gasket by a relatively simple manufacturing process. This allows a designer to provide a higher density material at selected locations. The disclosed method is relatively simple, and is easily modified to various gasket requirements. The second gasket material may be used at only one location across the lateral width of the gasket, or may be at several spaced locations, depending on the requirements for the gasket.

A unique gasket formed by the inventive method includes a planar body defining a periphery. In one embodiment the body is generally rectangular, with its periphery defined by a pair of spaced axial ends and a pair of spaced lateral edges. The axial ends and lateral edges may be either linear or non-linear. The gasket has a first density measured in a depth direction, perpendicular to its planar surface, over a first portion of its area. A higher density portion is found at a second portion of its area. This higher density portion extends to the periphery, and in the disclosed embodiments, to the axial ends of the gasket.

These and other objects and features of the present invention be best understood from the following specifications and drawings of which the following are a brief description.

DETAILED DESCRIPTION OF A PREFERRED EMBODIMENT

Figure 1:
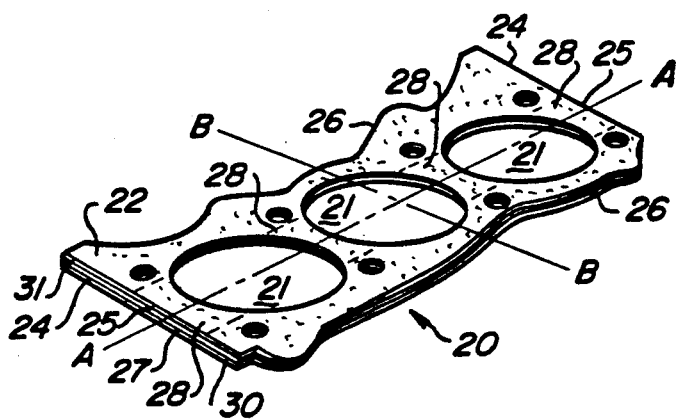
FIG. 1 is a perspective view of a gasket according to the present invention.

An improved gasket 20 having different densities across its lateral width is illustrated in FIG. 1. Gasket 20 is generally planar, with a longitudinal axial dimension extending along line A—A through a plurality of openings 21. A lateral axis B—B is defined in a plane parallel to gasket 20 and extends transversely to the longitudinal axis. Gasket 20 is generally rectangular with a pair of axial ends 24, which are generally linear and parallel to each other, and a pair of non-linear lateral sides 26. A top face 22 is formed of a first gasket material, with an intermediate layer 27 formed of a plurality of intermediate portions 28 disposed between top face 22 and a bottom face 30. Intermediate portions 28 extend only over a portion of the lateral width of face layers 22 and 30. Intermediate layer 27 extends to the axial ends 24, with the axially outermost of intermediate portions 28 having axial ends 25 coincident with axial ends 24 of gasket 20.

In designing gasket 20, a designer identifies areas where it is desired to have greater gasket density. As an example, high-stress areas such as the areas between cylinder openings in an engine may be identified for greater gasket density. Openings 21 are designed for alignment over cylinder openings in an engine. Intermediate portions 28 are disposed between openings 21 such that additional gasket density is provided in those areas. Alternatively, the areas may be selected to control or resist deformation of the housing members.

In identifying the areas for higher density, a computer model may be designed or a test mock-up may be built. Once the areas are identified, an intermediate layer is used in the identified areas.

For strength, an intermediate metallic core layer 31 may be sandwiched between top face 22 and bottom face 30. The metallic core layer may be perforated, with tabs extending towards both top face 22 and bottom face 30 to secure the metallic core layer. Metallic core layer 31 is typically of the same lateral width as top face 22 and bottom face 30.

Figure 2:
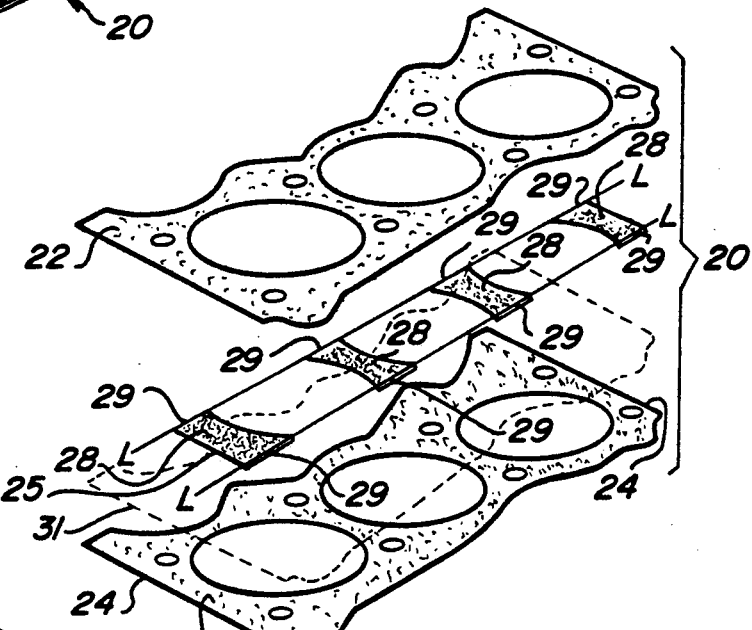
FIG. 2 is an exploded view of the gasket shown in FIG. 1.

As shown in FIG. 2, gasket 20 consist of top face 22, bottom face 30 and several intermediate portions 28. As described above, the location of intermediate layer 27 is selected to achieve higher densities in areas where higher densities are desirable. Metallic core layer 31, shown in phantom, is also included. As noted previously, the axially outermost intermediate portions 28 have axially outer ends 25 coincident with the axial ends 24 of gasket 20.

Each intermediate portion 28 has a pair of lateral edges 29 defining spaced parallel sides of intermediate layer 27. The respective edges 29 of the various intermediate portions 28 all lie along a line L—L. Lines L—L define linear lateral sides for intermediate layer 27, and are parallel to the longitudinal axis A—A.

Figure 3:
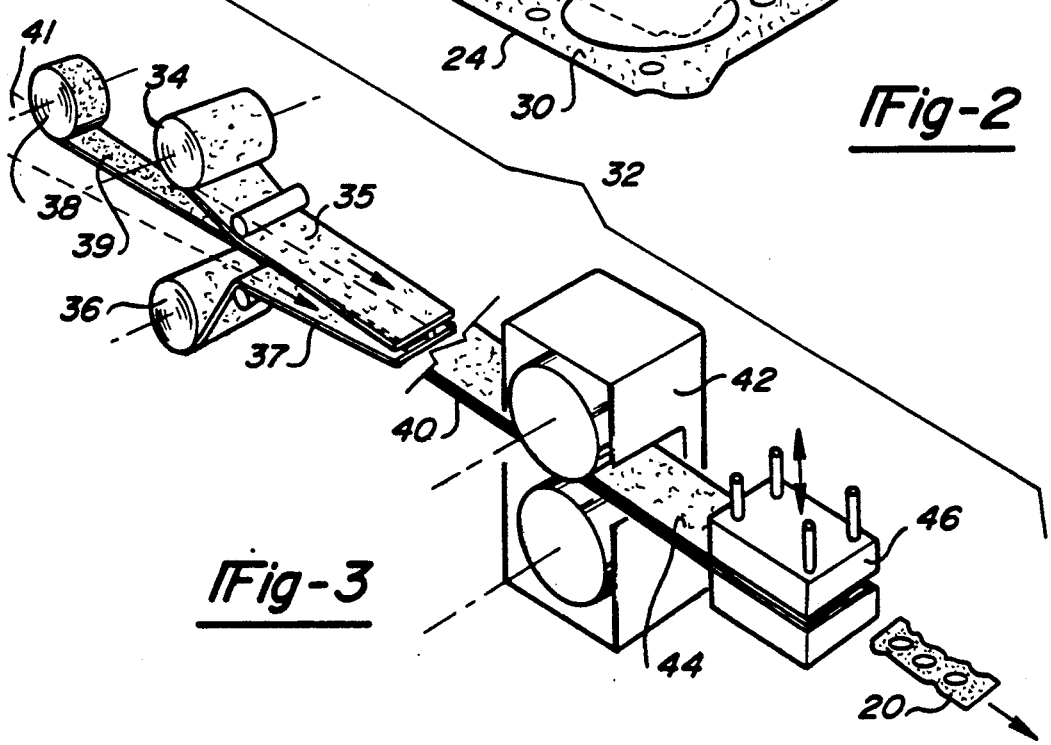
FIG. 3 is a largely schematic view of a system for forming the gasket shown in FIG. 1.

FIG. 3 is a view of a system 32 for forming gaskets 20. A first coil 34 dispenses a gasket material 35 and a second coil 36 dispenses a gasket material 37 along a path. Gasket materials 35 and 37 meet and move parallel to each other along a path. The layers will become top face 22 and bottom face 30, respectively. A third coil 38 dispenses an intermediate material 39 between materials 35 and 37. Intermediate material 39 is parallel to materials 35 and 37, and will become the intermediate layer in final gasket 20. The lateral width of material 39 is less than the lateral width of materials 35 and 37. Although the lateral width of materials 35 and 37 are shown to be equal, the widths may differ. Further, the method of this invention also applies to a system using only one layer 35 or 37. In the presently described embodiment, however, a metallic core layer 41, shown in phantom, may also be sandwiched between layers 35 and 37 and will become layer 31. Core layer 41 may be either perforate or solid, as is well known in the art, and is dispensed from a coil. Preferably, the intermediate material 39 would be between top face 22, and core material 41.

Layers 35, 37, 39 and 41 form a composite gasket material 40 which moves along a path to a roller station 42. Roller station 42 compresses the composite gasket material 40 to form a compressed material 44. Rollers 42 compress the composite gasket material 40 such that material 39 does not add to the depth, or distance between the outer faces of faces 22 and 30, which is constant across the width. Instead, intermediate layer 27 merely increases the density of a laterally central portion of gasket 20. Compressed material 44 then moves to a cutting station 46 where final gaskets 20 are stamped.

Figure 4:
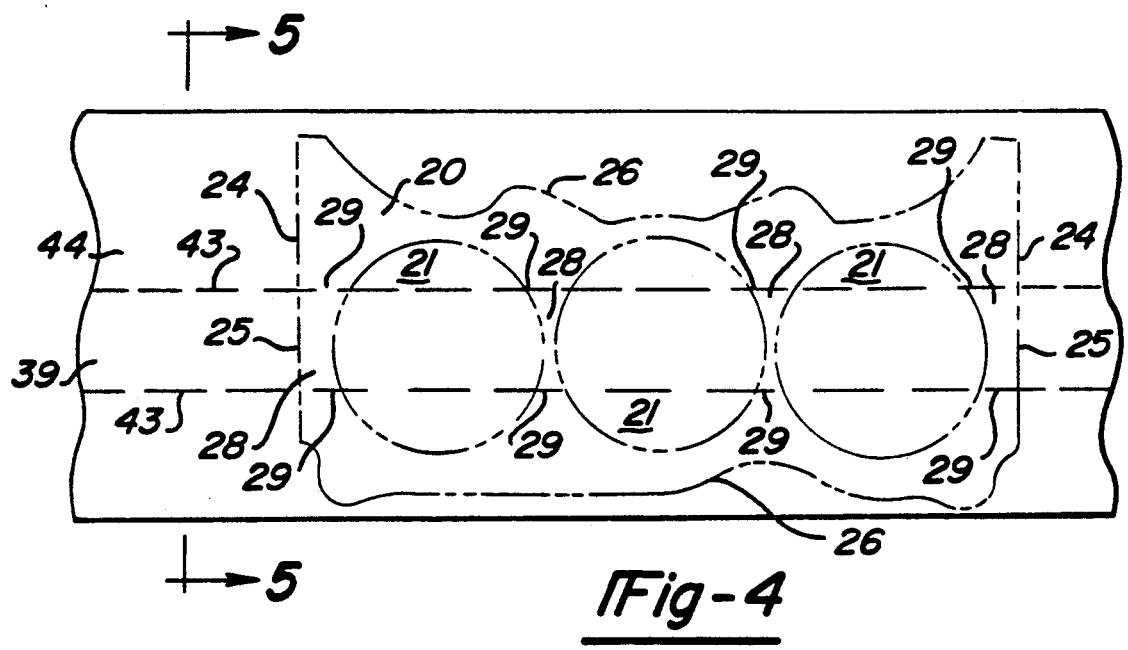
FIG. 4 is a plan view of a step in the manufacture of a gasket by the system illustrated in FIG. 3.

As shown in FIG. 4, when gaskets 20 are cut from compressed material 44 material 39 results in intermediate portions 28. Since intermediate material 39 is continuously disposed on materials 35 and 37, intermediate material 39 extends through the entire axial length of the final gasket 20. The axially outermost of intermediate portions 28 have axial ends 25 which are coincident with the axial ends 24 of gasket 20. Axial ends 25 of intermediate portions 28 extend over only a portion of the lateral width of gasket 20. Each intermediate portion 28 has lateral edges 29. Lateral sides 43 of intermediate material 39 are defined by lines that extends through the respective lateral edges 29 of the plurality of intermediate portions 28. These lines are coincident with lines L—L as shown in FIG. 2. Intermediate portions 28 are axially spaced by openings 21, but the intermediate layer 27 does extend, however, between axial ends 24 of gasket 20.

Figure 5:
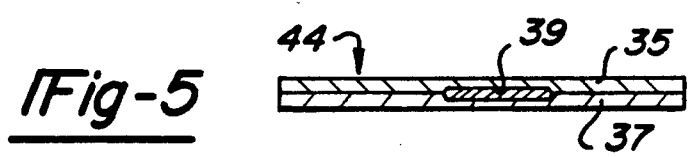
FIG. 5 is cross-sectional view along line 5—5 as shown in FIG. 4.

FIG. 5 is a cross-sectional view along line 5—5 as shown in FIG. 4. Material 39 is at the lateral center of the compressed gasket material 44. For simplicity, the metallic core is not shown such that the relative size and location of intermediate material 39 may be fully appreciated.

Figure 6:
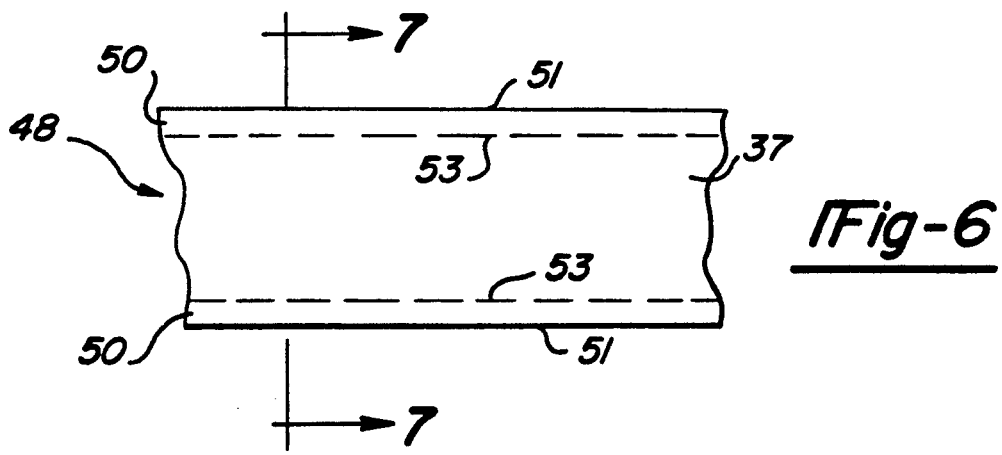
FIG. 6 is a view similar to FIG. 4, but showing an alternative gasket being formed.
Figure 7:
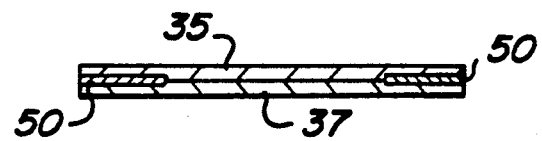
FIG. 7 is a view along line 7—7 as shown in FIG. 6.

FIG. 6 shows the use of the inventive method for a different application, where it is desired to have high density areas at the laterally outward sides of a gasket 48. A higher density portion 50 is disposed at each lateral side of gasket 48. For such an application, two rolls of intermediate material 39 are used to form a composite gasket material 40. Gasket 48 may be used for an aluminum engine to seal and resist deformation adjacent the coolant structure. As shown in FIG. 7, gasket 48 includes higher density intermediate layers 50 with upper layer 35 and lower layer 37. A metallic core may also be used.

When a gasket is stamped out of the composite material illustrated in FIG. 6, intermediate layers 50 extend to the axial ends of the gasket. Intermediate layers 50 have outer lateral edges 51, and inner lateral edges 53. Inner lateral edges 53 would each define a linear lateral side for the respective intermediate layer 50. Depending on the shape of the outer lateral sides of the gasket, outer lateral edges 51 of layers 50 may be either linear or non-linear.

Although the gasket embodiments disclosed in this invention have generally linear axial ends, it should be understood that depending on the final shape of the gasket, the axial ends may be non-linear. Further, if an axial end is non-linear the higher density portion may in some cases not be found at the axially outermost portions of the gasket. The higher density portion would extend to the periphery, and the non-linear axial end.

The intermediate gasket material may be the same material as the upper and lower layers, or they may be different materials. Any known gasket materials may be utilized. A coiled flexible graphite gasket material sold under the tradename Grafoil ™ may be used. Alternatively, a coiled flexible graphite gasket material sold under the tradename Calgraph ™ may be used. The metallic core layer is preferably a steel. Stainless, chromium-plated, tin-plated, low carbon or other steels may be used.

In a sample gasket formed with the inventive method, each face layer was 0.035 inch thick. The intermediate layer was 0.010 inch thick. A core layer was 0.0083 inch thick. The four layers formed a compressed gasket material which was 0.060 to 0.066 inch thick.

A preferred embodiment of the present invention has been disclosed. A worker of ordinary skill in the art will recognize, however, that certain modifications will come within the scope of this invention. For that reason the following claims should be studied in order to determine the true scope and content of this invention.

I claim:
1. A gasket comprising:
   a generally planar body having an outer circumference, said body being formed of a gasket material and having a first portion of a first density in a depth defined perpendicular to the plane of said body, a higher density portion of said gasket material being defined over a portion of said body, said higher density portion extending to at least two points on said outer circumference;

said body being generally rectangular, and having two spaced axial ends and two spaced lateral sides, said higher density portion extending to said outer circumference at both of said spaced axial ends, said higher density portion extending over only a portion of the lateral width of said body, said higher density portion having a pair of linear lateral edges:

said higher density portion being discontinuous in said axial direction, with openings formed through said body which separates said higher density portion into a plurality of axially spaced portions; and said gasket being defined by a plurality of layers, said higher density area being defined by an additional layer of said gasket material which extends axially between said axial ends over a lateral distance which is less than the lateral width of said body, and wherein outer layers are positioned on each side of said additional layer, and extend between the lateral edges of the gasket.

2. The gasket as recited in claim 1, wherein said lateral sides are non-linear.

3. The gasket as recited in claim 1, wherein said depth of said body is relatively constant over the entire area of said body.

4. A gasket comprising:
a generally planar body having an outer circumference, said body being formed of a gasket material and having a first portion of a first density in a depth defined perpendicular to the plane of said body, a higher density portion of said gasket material being defined over a portion of said body, said higher density portion extending to at least two points on said outer circumference;

said body being generally rectangular, and having two spaced axial ends and two spaced lateral sides, said higher density portion extending to said outer circumference at both of said spaced axial ends, said higher density portion extending over only a portion of the lateral width of said body; and a plurality of laterally spaced higher density portions, said higher density portions extending along said lateral sides of said body, said higher density portions including linear laterally inwardly facing edges.

5. The gasket as recited in claim 1, wherein said lateral sides are non-linear.

* * * * *